US008170743B2

(12) United States Patent
Salman et al.

(10) Patent No.: US 8,170,743 B2
(45) Date of Patent: May 1, 2012

(54) INTEGRATED DIAGNOSIS AND PROGNOSIS SYSTEM AS PART OF THE CORPORATE VALUE CHAIN

(75) Inventors: Mutasim A. Salman, Rochester Hills, MI (US); Pulak Bandyopadhyay, Bangalore (IN); Sugato Chakrabarty, Bangalore (IN); Rahul Chougule, Bangalore (IN); Sabyasachi Bhattacharya, Bangalore (IN); Soumen De, Bangalore (IN); Debprakash Patnaik, Bangalore (IN); Andrea M. Simon, Wolverine Lake, MI (US); Steven W. Holland, St. Clair, MI (US); Yuen-Kwok Chin, Troy, MI (US); Xiaodong Zhang, Mason, OH (US); Yilu Zhang, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 134 days.

(21) Appl. No.: 12/362,364

(22) Filed: Jan. 29, 2009

(65) Prior Publication Data

US 2010/0191414 A1 Jul. 29, 2010

(51) Int. Cl.
*G01M 17/00* (2006.01)
*G06F 17/00* (2006.01)

(52) U.S. Cl. ........................................ 701/35; 707/634

(58) Field of Classification Search .................... 701/35, 701/33, 29.1–34.4, 36; 707/E17.044, 634; 705/1, 7; 702/182
See application file for complete search history.

(56) References Cited

U.S. PATENT DOCUMENTS

| | | | | |
|---|---|---|---|---|
| 2002/0023329 | A1 * | 2/2002 | Nulman | 29/25.01 |
| 2008/0215400 | A1 * | 9/2008 | Ban et al. | 705/7 |
| 2008/0284575 | A1 * | 11/2008 | Breed | 340/438 |
| 2009/0177352 | A1 * | 7/2009 | Grau et al. | 701/33 |

OTHER PUBLICATIONS

RD416134, Dec. 1998, Derwent, IBMC.*
RD416134, Dec. 1998, USA, IBMC.*

* cited by examiner

*Primary Examiner* — James Trammell
*Assistant Examiner* — Muhammad Shafi
(74) *Attorney, Agent, or Firm* — John A. Miller; Miller IP Group, PLC

(57) ABSTRACT

An integrated diagnosis and prognosis system that collects vehicle information over the life of a vehicle and its development. The system provides the collected vehicle information to supplier management, product development management, service/dealership management, customer relations departments and production facilities, which use the information to take certain action for existing vehicles, fleets of vehicles or future vehicles to improve vehicle reliability and quality.

20 Claims, 2 Drawing Sheets

INTEGRATED DIAGNOSIS AND PROGNOSIS SYSTEM AS PART OF THE CORPORATE VALUE CHAIN

BACKGROUND OF THE INVENTION

1. Field of the Invention

This invention relates generally to an integrated diagnosis and prognosis system that collects vehicle information over an entire vehicle life-cycle and, more particularly, to an integrated diagnosis and prognosis system that collects vehicle information from vehicles over their entire life-cycle and distributes the information to various entities, such as supplier management, product development management, service/dealership management, customer relations departments and production facilities to improve vehicle quality and reliability.

2. Discussion of the Related Art

Vehicles employ many systems, sub-systems and components. Each of these systems, sub-systems and components typically have a certain useable life, and may fail for one reason or another during operation of the vehicle. Because failure of the various systems, sub-systems and components may be inconvenient, or otherwise, for a vehicle owner, it may be desirable to predict the life of the various systems, sub-systems and components so that appropriate maintenance and/or part replacement can be performed before the system, sub-system or component actually fails, thus increasing the quality or perceived quality of the vehicle.

Much information can be obtained from vehicle systems, sub-systems and components at different locations associated with the vehicle and its production and use, such as dealerships, suppliers, engineering production managers, customer relations personnel, etc. Thus, it may be desirable to provide a process for obtaining information from all of the various locations related to vehicle design, development and use so that information concerning the vehicle systems, sub-systems and components can be better obtained, and better decisions concerning the diagnosis and prognosis of the systems, sub-systems and components can be provided.

Typical vehicle analysis concerning the failure of systems, sub-systems and components has to do with diagnostics where once such a system, sub-system or component has failed, appropriate personnel typically determine the root cause of the failure. Vehicle manufacturers would be better served to identify the prognosis of the various systems, sub-systems and components to predict their useful life and take necessary action prior to the system, sub-system or component actually failing. In other words, it may be desirable to determine the state of health of the various systems, sub-systems and components on a vehicle. Further, such prognostic types of analysis will have significant benefits from a cost perspective where instead of replacing systems, sub-systems and components, the system, sub-system or component may be able to be fixed prior to it failing.

SUMMARY OF THE INVENTION

In accordance with the teachings of the present invention, an integrated diagnosis and prognosis system is disclosed that collects vehicle information over the life of a vehicle and its development. The system provides the collected vehicle information to supplier management, product and process development management, service/dealership management, customer relations departments and production facilities, which use the information to take certain action for existing vehicles, fleets of vehicles or future vehicles to improve vehicle reliability and quality.

Additional features of the present invention will become apparent from the following description and appended claims, taken in conjunction with the accompanying drawings.

DETAILED DESCRIPTION OF THE EMBODIMENTS

The following discussion of the embodiments of the invention directed to an integrated diagnosis and prognosis system for collecting and distributing vehicle information is merely exemplary in nature, and is in no way intended to limit the invention or its applications or uses.

As will be discussed below, the present invention proposes an integrated diagnosis and prognosis system that supports the management of the corporate value chain. Based on real-time and off-line diagnosis and prognosis information collected across the value chain, the integrated system influences suppliers interactions, vehicle engineering requirements, development and processes, production validation, service and dealership processes and procedure and customer relations.

As the vehicle proceeds through its life, there is much diagnosis data information, such as engineering algorithms, root causing, validation and evaluation results, fault coverage, false alarm, service accuracy, field experience, customer satisfaction, supplier quality, warrant data, etc., that can be spread around the several functions of the corporate value chain. This information can be collected and analyzed to be integrated in a manner that improves current vehicle and future vehicle reliability and quality.

One of the well known causes for warranty costs is referred to as no trouble found (NTF). NTFs are a clear indicator that current diagnostic systems and data are not sufficient to identify the great majority of vehicle problems. An NTF starts with a customer complaining about a particular abnormal condition, such as intermittent loss of torque, in the vehicle and the dealer, OEM or supplier is not able to replicate the problem at their end. Under the invention, when the vehicle is brought to the dealer, the dealer runs standard tests, but is not able to replicate the condition. Then, the dealer sends the particular part to the OEM. The dealer can provide customer verbatims, diagnostic trouble codes and labor codes to the OEM. The OEM will analyze this information with a field report, fault models, design data and diagnostic algorithms, and provide the data in a form that can help a supplier run detailed tests to understand the root cause. Once the root cause is analyzed and the problem is fixed, such as by flashing or upgrading software in an ECU, the solution is provided in new products. The new product then becomes reliable with respect to the reported problem.

Figure 1:
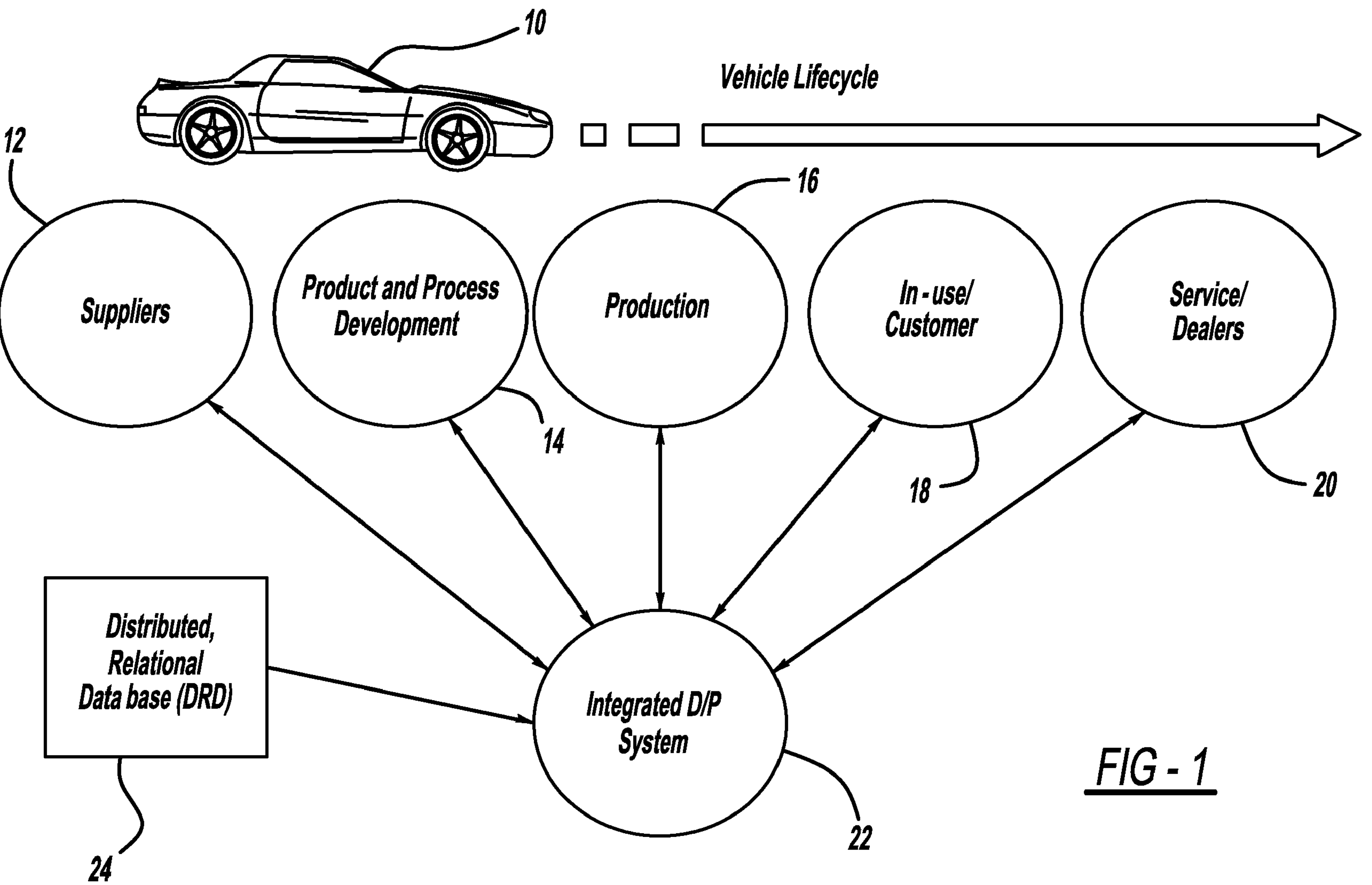
FIG. 1 is an illustration of a vehicle life-cycle as a vehicle progresses through assembly, use and service.

FIG. 1 is an illustration of a vehicle 10 passing through its life-cycle. Particularly, suppliers 12 provide vehicle parts and supplies that are used to manufacture the vehicle 10 and product and process development 14 design the various systems, sub-systems and components that go into the vehicle 10 using the parts and supplies provided by the suppliers 12. The design and development of the vehicle 10 and the parts and supplies 12 are used during production 16 of the vehicle 10. The vehicle 10 is used by a customer 18, and may require service from dealerships or repair shops 20 during operation of the vehicle 10 for preventative maintenance or failure of various systems, sub-systems and components on the vehicle 10.

As will be discussed below, the present invention proposes an integrated diagnosis and prognosis system 22 that receives and collects information from the various locations along the vehicle life-cycle, namely, the suppliers 12, the product and process development 14, production 16, the customer 18 and the dealerships 20, analyzes the information provided from all of these locations. The system 22 returns the analyzed information back to each of the suppliers 12, the product and process development 14, production 16, the customer 18 and the dealerships 20 so that the information collected from each of the various locations separately can be combined and analyzed to be used by all of the locations collectively. Further, the integrated system 22 sends information to a distributed relational database 24 where the information is stored and can be retrieved for future use.

Figure 2:
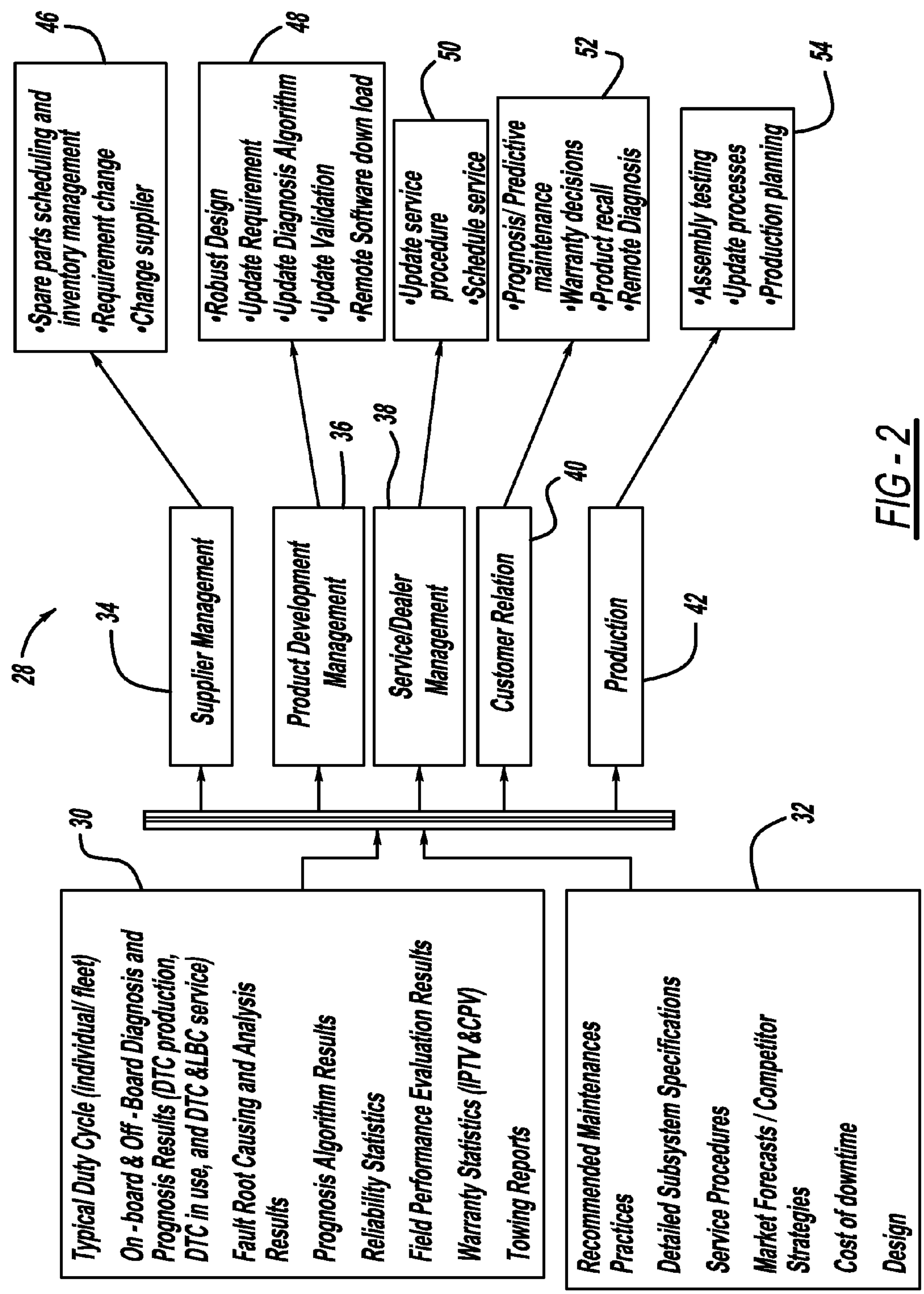
FIG. 2 is a block diagram of an integrated diagnosis and prognosis system that collects and distributes vehicle diagnosis and prognosis information through the various entities involved in a vehicle's life.

FIG. 2 is a block diagram of an integrated diagnosis and prognosis system 28 of the type discussed above in FIG. 1. As above, the system 28 collects information from all of the sources and entities that a vehicle may encounter during its life-cycle, and that information can be used in many different ways to improve vehicle quality and customer satisfaction as part of a corporate value chain.

At box 30, the system 28 collects engineering and design information and at box 32 the system 28 collects information from the vehicle 10 itself after it has been transferred to the customer. The engineering design information at the box 30 and the vehicle information at the box 32 identify some of the information that can be collected by the system 28, but is not intended to be an exhausted list, only representative. The information collected at the boxes 30 and 32 can be from all of the sources along the vehicle life-cycle discussed above, namely the suppliers 12, product and process development 14, production 16, the customer 18, dealerships 20, etc., or a certain number of the sources.

The system 28 may collect information concerning a typical duty cycle of an individual vehicle or a fleet of vehicles, meaning how often the vehicle or vehicles are driven. Further, the system 28 may collect information concerning on-board and off-board diagnosis and prognosis results from diagnostic trouble codes (DTC) during production and vehicle use. Also, the system 28 may collect information relating to vehicle systems, sub-systems and components having to do with fault root causes and may analysis the results of those fault root causes. Further, the system 28 may collect prognosis algorithm results from various systems, sub-systems and components on the vehicle 10 that are provided by the various and several systems, sub-systems and components concerning their individual state of health. Also, the system 28 may collect reliability statistics for a particular vehicle, or a particular system, sub-system or component on the vehicle 10. Further, the system 28 may collect fuel performance evaluation results from vehicle testing. Also, the system 28 may collect warranty statistics concerning which systems, sub-systems and components on the vehicle 10 have been serviced as a result of various warranty claims. Further, the system 28 may collect towing reports of how and when the vehicle 10 was towed for service.

Various information can be collected about the vehicle 10 at the box 32, such as recommended maintenance practices, detailed sub-system specifications, service procedures, market forecasts and competitor strategies, cost of down time, vehicle design, etc.

By collecting the available vehicle information in this manner, specific components and sub-systems can be analyzed for failures and state of health where various factors can also be considered, such as how much the vehicle is being driven, the climate the vehicle is being driven in, the geography the vehicle is being driven in, etc.

As discussed above, the information collected by the integrated system 28 is then passed on to the various entities that interact with the vehicle through its life-cycle. Particularly, the information collected from the boxes 30 and 32 is sent to supplier management 34, product and process develop management 36, service/dealer management 38, customer relations departments 40 and production facilities 42. Each one of these individual entities then processes the data provided and removes portions to particular vehicle systems, sub-systems and components that is relevant to its management protocol. For example, the various suppliers under the supplier management 34 may be in charge of different systems, sub-systems and components that go on the vehicle and will then be interested in the information concerning those systems, sub-systems and components.

The supplier management 34 can use the information collected by the system 28 to provide spare part scheduling and inventory management in response to certain systems, sub-systems or components on the vehicle failing at box 46. For example, if certain parts on a vehicle are failing at a certain rate, then the supplier management 34 can change its spare parts scheduling and inventory management to meet the needs for those spare parts. Also, the supplier management 34 can make changes to its policies depending on what parts need to be replaced on a vehicle. Further, a change in supplier may be required based on how a particular supplier provides parts based on the information provided.

The product and process develop management 36 can use the information collected by the system 28 to improve vehicle design, up-date system, sub-system and component requirements, update diagnosis algorithms, update validation requirements for quality control and provide remote software download for existing vehicles in the field to improve diagnosis and prognosis analysis at box 48.

The service/dealership management 38 can use the information collected by the system 28 to update or improve service procedures and schedule service for systems, sub-systems or components on the vehicle that may be close to failing at box 50.

The customer relations department 40 can use the information collected by the system 28 for a prognosis and predicted maintenance purposes, providing warranty decisions, produce product recalls, provide remote diagnosis of the vehicle, etc. at box 52.

The production facility 42 can use the information collected by the system 28 to provide assembly testing, update production processes, provide production planning, etc. at box 54.

It is stressed that the above examples for collecting data and using the collected data in a certain manner for a specific vehicle model, vehicle system, sub-system or component, vehicle fleet, etc. are merely representative of the types of information that can be collected and the types of responses and actions that can be provided to the collected information. The present invention is intended to be a high level system and method for collecting data at the various stages of the vehicles life, and then use that collected data for all of the stages in the vehicle life.

The integrated system 28 discussed above provides a number of advantages, including improvement of diagnostics quality by requiring development, counting tools and standards, algorithms, service procedures, service tools, DTCs, etc., the reuse of diagnostics data and codes, the documentation of lessons learned and best practices across business units, management of diagnostics data, feedback of field information an insurance of fast decisions and actions, interaction of the different functions in the value chain, including marketing, continuous design improvement, enhanced vehicle quality, reliability and durability and warranty reduction.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. An integrated diagnosis and prognosis system comprising:

a processing sub-system configured to collects on-board and off-board diagnosis and prognosis information about vehicle sub-systems and components from vehicle assembly until vehicle end of life, wherein the collected information relates to one or more vehicles, said processing sub-system providing the collected information;

a supplier management sub-system responsive to the collected information from the processing sub-system, said supplier management sub-system taking certain actions depending on the collected information to improve vehicle reliability;

a product development management sub-system responsive to the collected information from the processing sub-system, said product develop management sub-system taking certain actions depending on the collected information to improve vehicle reliability;

a service/dealership management sub-system responsive to the collected information from the processing sub-system, said service/dealer management sub-system taking certain actions depending on the collected information to improve vehicle reliability;

a customer relations sub-system responsive to the collected information from the processing sub-system, said customer relations sub-system taking certain actions depending on the collected information to improve vehicle reliability; and a production sub-system responsive to the collected information from the processing sub-system, said production sub-system taking certain actions depending on the collected information to improve vehicle reliability.

2. The system according to claim 1 wherein the supplier management sub-system provides spare part scheduling and inventory management to improve vehicle reliability.

3. The system according to claim 1 wherein the product development management sub-system improves vehicle design, updates vehicle requirements, updates vehicle diagnosis algorithms, updates system validations and provides remote software downloads to improve vehicle reliability.

4. The system according to claim 1 wherein the service/dealership management sub-system updates service procedures and schedules service for the vehicle to improve vehicle reliability.

5. The system according to claim 1 wherein the customer relation sub-system performs prognosis and predictive vehicle maintenance, makes warranty decisions, produces product recalls and provides remote vehicle diagnosis to improve vehicle reliability.

6. The system according to claim 1 wherein the production sub-system performs assembly testing, updates assembly processes and provides production planning to improve vehicle reliability.

7. The system according to claim 1 further comprising a distributed database that stores the collected information to be assessable to the supplier management sub-system, the product development management sub-system, the service/dealership management sub-system, the customer relations sub-system and the production sub-system for future vehicles.

8. An integrated diagnosis and prognosis system for collecting on-board and off-board diagnosis and prognosis information about vehicle systems, sub-systems and components through the entire life-cycle of a vehicle from design and development of the vehicle to maintenance and use of the vehicle, wherein the collected information relates to one or more vehicles and is received from a plurality of sources, said system providing the collected diagnosis and prognosis information to various entities involved in the life-cycle of the vehicle and the life-cycle of future vehicles.

9. The system according to claim 8 wherein one of the entities is a supplier management that provides spare part scheduling and inventory management.

10. The system according to claim 8 wherein one of the entities is product development management that improves vehicle design, updates vehicle requirements, updates vehicle diagnosis algorithms, updates system validations and provides remote software downloads.

11. The system according to claim 8 wherein one of the entities is a service/dealership department that updates service procedures and scheduling service for the vehicle.

12. The system according to claim 8 wherein one of the entities is a customer relations department that performs prognosis and predictive vehicle maintenance, makes warranty decisions, produces product recalls and provides remote vehicle diagnosis.

13. The system according to claim 8 wherein one of the entities is vehicle production that performs vehicle assembly testing, updates assembly processes and provides production planning.

14. The system according to claim 8 further comprising a distributed database that stores the collected information to be assessable to the supplier management sub-system, the product development management sub-system, the service/dealership management sub-system, the customer relations sub-system and the production sub-system for future vehicles.

15. A method for integrating diagnosis and prognosis information, wherein the method is performed by a processor instructed to execute a program stored on a non-transitory computer-readable medium, said method comprising:

collecting on-board and off-board diagnosis and prognosis data about vehicle sub-systems and components from vehicle assembly until vehicle end of life, wherein the data is collected from a plurality of sources and relates to one or more vehicles;

providing the collected information to supplier management that takes certain actions depending on the collected information;

providing the collected information to product development management that takes certain actions depending on the collected information;

providing the collected information to service/dealership management that takes certain actions depending on the collected information;

providing the collected information to customer relations departments that take certain actions depending on the collected information; and providing the collected information to production facilities that take certain actions depending on the collected information.

16. The method according to claim 15 wherein the supplier management provides spare part scheduling and inventory management.

17. The method according to claim 15 wherein the product development management improves vehicle design, updates vehicle requirements, updates vehicle diagnosis algorithms, updates system validations and provides remote software downloads.

18. The method according to claim 15 wherein the service/dealership management updates service procedures and schedules service for the vehicle.

19. The method according to claim 15 wherein the customer relations performs prognosis and predictive vehicle maintenance, makes warranty decisions, produces product recalls and provides remote vehicle diagnosis.

20. The method according to claim 15 wherein the production facilities perform assembly testing, updates assembly processes and provides production planning.

* * * * *